United States Patent [19]
Padilla

[11] Patent Number: 5,277,924
[45] Date of Patent: Jan. 11, 1994

[54] RADIO FREQUENCY PROOFING AND CONVECTION BAKING APPARATUS AND METHOD FOR MAKING PIZZA

[75] Inventor: James A. Padilla, North Wales, Pa.

[73] Assignee: Proctor & Schwartz, Inc., Horsham, Pa.

[21] Appl. No.: 982,298

[22] Filed: Nov. 25, 1992

[51] Int. Cl.$^5$ .............................. A21D 8/00; H05B 6/00
[52] U.S. Cl. ...................................... 426/523; 99/451; 99/443 C; 219/776; 219/771; 426/237
[58] Field of Search ............... 426/237, 241, 244, 523; 99/358, 451, 443 C; DIG. 14; 219/10.41, 10.69, 10.81

[56] References Cited

U.S. PATENT DOCUMENTS

| | | | |
|---|---|---|---|
| 3,514,576 | 5/1970 | Hilton et al. | 219/400 |
| 3,884,213 | 5/1975 | Smith | 99/473 |
| 4,154,861 | 5/1979 | Smith | 426/523 |
| 4,164,591 | 8/1979 | Ahlgren et al. | 426/523 |
| 4,289,792 | 9/1981 | Smith | 426/241 |
| 4,318,931 | 3/1982 | Schiffmann et al. | 426/523 |
| 4,377,109 | 3/1983 | Brown et al. | 426/523 |
| 4,381,317 | 4/1983 | Fournier et al. | 426/523 |
| 4,471,000 | 9/1984 | Brown et al. | 426/523 |
| 4,587,946 | 5/1986 | Doyon et al. | 426/523 |
| 4,701,340 | 10/1987 | Bratton et al. | 426/523 |
| 4,919,951 | 4/1990 | Jensen et al. | 99/451 |
| 4,938,127 | 7/1990 | van Lengerich | 99/451 |
| 4,957,041 | 9/1990 | van Lengerich | 99/451 |
| 4,957,042 | 9/1990 | van Lengerich | 99/451 |
| 4,958,054 | 9/1990 | Keller et al. | 99/451 |
| 5,149,556 | 9/1992 | Le Viet | 426/523 |

*Primary Examiner*—George Yeung

[57] ABSTRACT

Apparatus and method for making pizza in a continuous process and in commercial quantities using radio frequency energy and hot air impingement ovens in a conveyorized system.

14 Claims, 2 Drawing Sheets

RADIO FREQUENCY PROOFING AND CONVECTION BAKING APPARATUS AND METHOD FOR MAKING PIZZA

FIELD OF THE INVENTION

The present invention relates to an apparatus and a method for making pizza, and more particularly, the present invention relates to the use of radio frequency energy and hot air impingement ovens in a conveyorized system for making pizza in a continuous process.

BACKGROUND OF THE INVENTION

The process of making pizza begins with preparing dough and forming the dough into individual pizza shells. Toppings are added to the pizza shell and the topped pizza is placed in an oven. The oven subjects the pizza to controlled heat and humidity to raise and bake the dough and cook the toppings. Traditionally a hot air convection oven has been used for this purpose. The time required to prepare and cook a single pizza is approximately 8 to 20 minutes at an oven temperature of 200 to 315 degrees Celsius.

The time required to cook pizza is generally limited by the time required for the leavened dough to rise. This process of raising the dough is known in the baking trade as proofing. Shorter baking times, or higher baking temperatures will affect the proofing of the pizza shells such that the dough may not raise at all, or may blister and burn. The pizza toppings do not have such critical limitations and can be baked with fewer restrictions on time and temperature.

To facilitate the making of pizzas in commercial quantities, an assembly line approach has been developed. In this type of pizza making approach, the pizza shells are normally proofed before toppings are added to them. After the shells have been proofed, the process of adding the toppings and baking the fully prepared pizza can be accomplished relatively quickly in large quantities. The critical limitation on the efficiency of this approach is the amount of time required to proof the pizza shells. Traditionally, the shells are proofed in a heated, humidity-controlled chamber requiring approximately 40 minutes at a temperature of approximately 40 degrees Celsius and an 80 percent relative humidity.

OBJECTS OF THE INVENTION

With the foregoing in mind, a primary object of the present invention is to provide an improved method and an apparatus which is capable of reducing the amount of time required to proof dough used for pizza shells.

Another object of the present invention is to increase the overall efficiency of producing pizzas in commercial quantities.

A further object of the present invention is to provide an efficient method and apparatus for producing high quality pizzas in commercial quantities on a continuous basis.

SUMMARY OF THE INVENTION

More specifically, the present invention accomplishes the aforementioned objects by utilizing a combination of conventional hot air convection and radio frequency baking methods in a conveyorized system.

To this end, pizza dough is prepared in bulk quantities, and leavened dough is then partially proofed, or pre-proofed, in its bulk form in a traditional hot air convection oven. The pre-proofed dough is formed into individual pizza shells and placed on a conveyer at the conveyor's loading station. The conveyor transports the pizza shells to a radio frequency chamber. While the pizza shells are in this chamber, radio frequency energy couples into the dough allowing the pizza shell to be fully proofed in a range of 20 to 30 seconds. After the conveyor transports the pizza shells out of the radio frequency chamber, the proofed pizza shells advance to an ingredient loading station where toppings are added to the proofed pizza shells. Downstream from the ingredient loading station is a final baking hot air impingement oven in which the shells and their toppings are baked.

The process economically produces high quality pizza in commercial quantities.

BRIEF DESCRIPTION OF THE DRAWINGS

The foregoing and other objects, features and advantages of the present invention should become apparent from the following description when taken in conjunction with the accompanying drawing, in which.

DESCRIPTION OF THE PREFERRED APPARATUS AND METHOD

Figure 1:
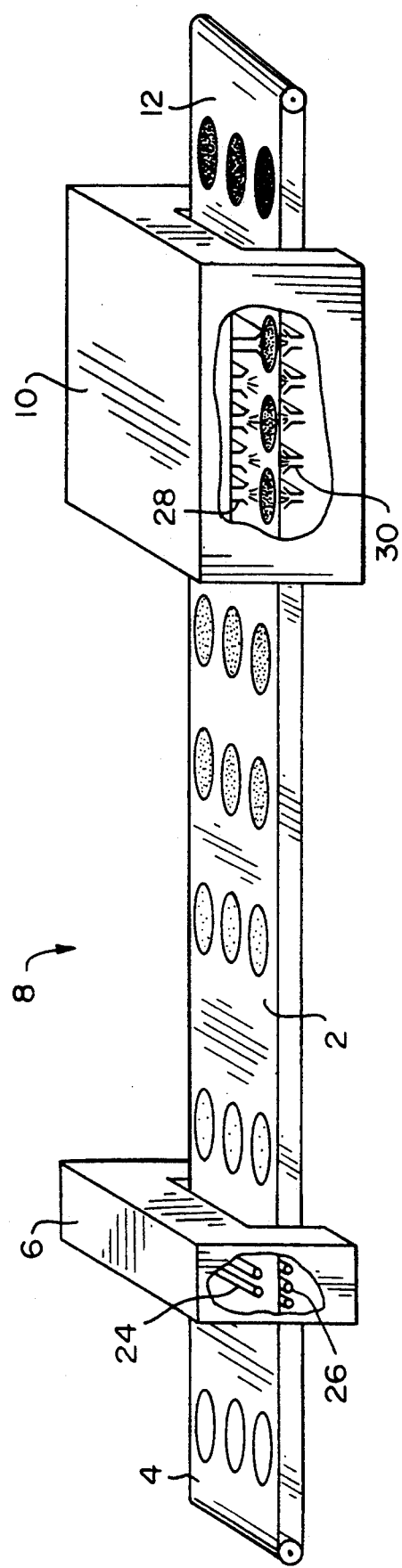
FIG. 1 is a perspective schematic view of an apparatus to make pizza in bulk quantities.

Referring now to the drawings, FIG. 1 illustrates an endless belt conveyor 2 upon which pizza shells travel from a loading station 4 to an unloading station 12. Pizza shells without toppings are loaded onto the conveyor 2 at loading station 4. The conveyor 2 transports the shells downstream to a radio frequency chamber 6. Radio frequency chamber 6 has positive electrodes 24 above conveyor 2 and negative electrodes 26 below conveyor 2. As the pizza shells continuously move through radio frequency chamber 6, electric energy couples into the dough resulting in the generation of heat. The pizza shells leave the radio frequency chamber 6 fully proofed with evidence of rising. The pizza shells continue moving downstream through a series of ingredient loading stations 8. Various toppings are placed on the fully proofed pizza shells as the shells approach a hot air impingement oven 10. The oven has a series of upper nozzles 28 and lower nozzles 30 which direct hot air to the top and bottom of the pizzas. The pizza shells travel through the hot air impingement oven 10 and reach the unloading station 12 fully cooked and ready for packaging.

Figure 2:
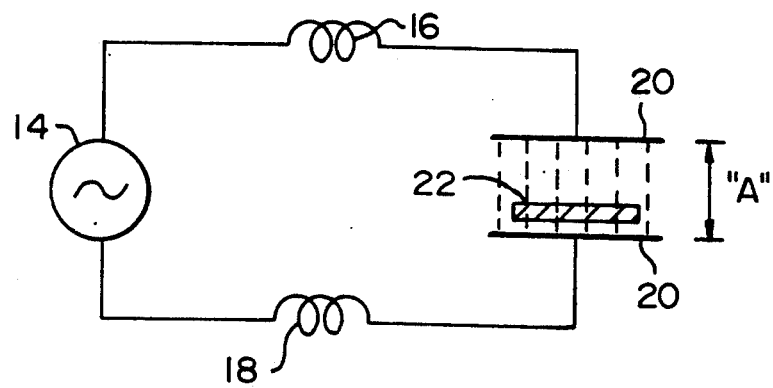
FIG. 2 is an electrical circuit diagram illustrating radio frequency cooking.

FIG. 2 illustrates the basic circuit of a radio frequency oven. The radio frequency generator 14 has a built in inductance 18 and is hooked across an adjustable tuning inductance 16 and electrodes 20. Electrodes 20 are separated by an air gap of distance "A" which can be altered to further tune the circuit. The dotted lines between the electrodes 20 represent the uniform voltage orientation to which the load, in this case pizza shells, is subjected. Unlike traditional cooking methods where heat from an external source is applied to the pizza dough, the pizza shell 22 is part of the radio frequency cooking circuit with heat being generated within the pizza shell itself.

An important aspect of the radio frequency cooking circuit is its ability to self regulate the power output. When there are no pizza shells between the electrodes, the circuit acts as an open circuit and the power output is minimal. When the pizza shells enter the circuit, the circuit acts more like a closed circuit instantly applying power to heat the dough. As the pizza moves through the chamber, the dough characteristic changes from relatively resistive to relatively capacitive. Therefore, as the dough is proofed, the characteristics of the circuit change and power instantly varies. This results in less heat being generated in the dough and prevents overheating or over-proofing.

The radio frequency process of proofing the dough has many advantages over traditional hot air convection baking. The most important advantage is speed. While proofing pizza dough in a convection oven is performed in minutes, proofing in radio frequency is performed in seconds. Further, since the radio frequency process is self regulating, over-proofing is not a problem, as with convection proofing. Additionally, better uniformity of proofing is accomplished with the radio frequency process since wet spots in the dough draw more energy. Other advantages include better control of heating rate, reduced heat losses, smaller equipment size, and cleaner installations.

The radio frequency process of proofing dough has many advantages over microwave baking processes. Microwave ovens produce constant power output regardless of whether or not a product is within its cavity. This diminishes its usefulness in a conveyorized system where the load will constantly vary. Also, operation of a microwave oven with no load can cause damage to the microwave generator. The electric fields within a microwave oven are random; therefore, the dough is proofed with poor uniformity. Other advantages of the radio frequency process over that of microwave are lower cost generators, longer lasting generators, and easier protection against leakage of the waves to the environment.

Figure 3:
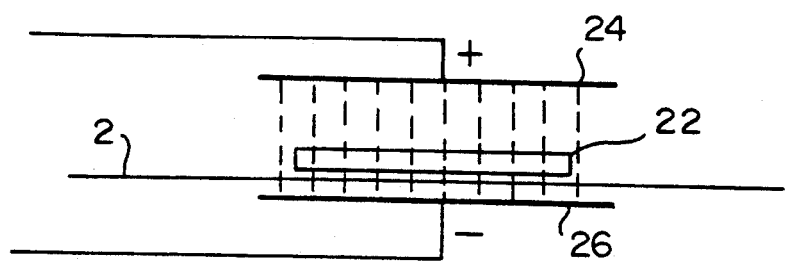
FIG. 3 is a schematic elevational view of the orientation of the electrodes in a platen type radio frequency chamber.
Figure 4:
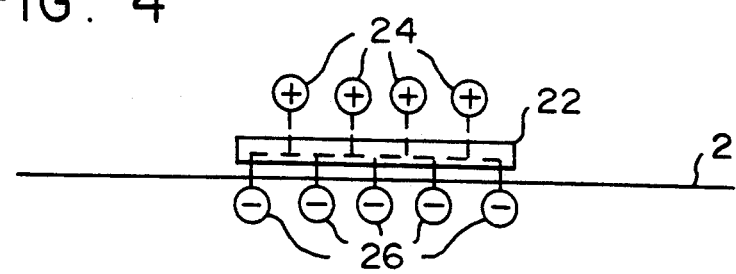
FIG. 4 is a schematic elevational view of the orientation of the electrodes in a staggered type radio frequency chamber.
Figure 5:
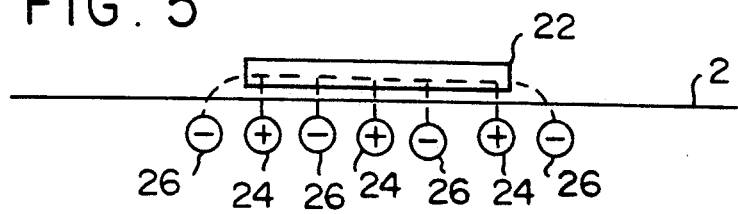
FIG. 5 is a schematic elevational view of the orientation of the electrodes in a stray field type radio frequency chamber.

FIGS. 3, 4 and 5 illustrate three common electrode types which can be used to establish the radio frequency field in the radio frequency chamber. FIGS. 3 and 4 are electrode types which are most suitable for processing pizza shells. FIG. 3 illustrates the platen type. As shown therein, pizza shell 22 on a non-metallic conveyor 2 passes through the positive electrode 24 and the negative electrode 26. The electric field is represented by the dotted lines between the positive electrode 24 and the negative electrode 26. FIG. 4 illustrates the staggered type of electrode system, and FIG. 5 illustrates the stray field type of electrode system. Both of these types utilize multiple electrode rods positioned perpendicular to the path of non-electric conveyor 2.

The output power density of the radio frequency generator should be in a range of 7.5 to 13.0 KW per square meter. The generated frequency should be 27.12 MHz+/−0.06%. The air gap between the upper electrodes and the pizza shells should be in a range of 25 to 51 millimeters. The lower electrodes should be located as physically close as is practical to the underside of the non-metallic conveyor belt which carries the pizza shells. In the alternative, a metallic conveyor belt can be used as the bottom electrode. The time required for the pizza shells to pass through the radio frequency chamber in order to be fully proofed is approximately 30 seconds; however, since the radio frequency circuit is self regulating, the time can be longer. The pizza shells should enter the radio frequency chamber at room temperature, approximately 22–23 degrees Celsius. After thirty seconds in the electric radio frequency field, the pizza shells should exit the chamber at a temperature of about 32–40 degrees Celsius. Depending on the product ingredients, the temperatures may vary somewhat from these examples given.

The finishing oven should subject the fully topped pizzas to a temperature of 230 to 290 degrees Celsius. In order to fully bake the pizza, this temperature should be applied to the pizza for 1 to 2 minutes. Preferably, the finish baking oven is of the hot-air impingement type wherein jets of hot air are directed downwardly through elongate nozzles disposed in spaced relation across the path of conveyor movement. The nozzles, or slots, direct the jets of high temperature air at a velocity of about 4 to 7 meters per second against the top and bottom side of the topped pizza shells. The height of the upper nozzles above the pizza shells in the impingement oven can range from 50 to 205 millimeters. One embodiment as shown in FIG. 1 has most of the upper nozzles 14 at a higher distance from the pizza shells with the last in the series of upper nozzles being at a lower distance to crispen the crust and develop surface color just before the shells exit the oven. The lower nozzles are located 50 millimeters or closer to the underside of the conveyor belt.

As an example of the above process, dough was pre-proofed in its bulk form for 15 minutes in a convection proofing chamber having a dry bulb temperature of about 32 degrees Celsius and a relative humidity of 80%. While pre-proofing the dough is not required, in this example it was performed because it was believed to enhance organoleptic qualities. The pre-proofed dough was formed into circular flat shells having a 230 millimeter diameter and 150 gram weight.

The shells, at a temperature of about 23 degrees Celsius, were loaded onto the conveyor. The shells traveled through the radio frequency chamber for 30 seconds leaving the chamber at a temperature of 50 degrees Celsius with evidence of rising. The chamber was powered by a 6 KW radio frequency generator with a staggered rod electrode system and generating at 27.12 MHz. The air gap between electrodes was 25 to 51 millimeters.

As the pizza shells traveled through the ingredient loading station, 120 grams of sauce, 50 grams of ham, 44 grams of cheese, 8 grams of water spray and 6 half olives were loaded on the shells. The fully topped pizza shells entered the impingement oven at about 28 degrees Celsius. The impingement oven had upper nozzles which terminated at distances of 205 millimeters and 75 millimeters above the pizza shells. The lower nozzles of the impingement oven were within 50 millimeters from the underside of the conveyor belt. The pizzas traveled through the impingement oven in two minutes and were subjected therein to hot air at a temperature of 225 to 235 degrees Celsius ejected from the nozzles at a velocity of 4 to 7 meters per second. The temperature of the pizza exiting the impingement oven was about 90 degrees Celsius.

The resulting pizza was taste tested and found to be of high organoleptic quality such as taste, texture, color, and overall appearance.

While a preferred method and apparatus of practicing the invention has been described in detail with respect to a specific example, various modifications, alterations and changes may be made without departing from the spirit and scope of the invention as defined in the appended claims.

I claim:

1. Apparatus for preparing pizza comprising:

conveyor means having a loading station and an unloading station downstream therefrom such that a pizza dough shell placed at said loading station is moved by said conveyor through stages of processing to said unloading station;

a radio frequency chamber located downstream of said loading station for proofing by means of radio frequency energy pizza dough shells passing through said radio frequency chamber on said conveyor;

an ingredient loading station located above said conveyor means downstream of said radio frequency chamber for enabling topping ingredients to be added on top of said pizza dough shells as they advance; and a final baking oven located downstream of said topping loading station for finish baking the prepared pizza dough shells and topping into pizza, whereby pizza is prepared in an efficient, continuous process.

2. Apparatus according to claim 1, in which said radio frequency chamber includes an electrode system for establishing a radio frequency field in said radio frequency chamber for coupling electrically with said pizza shells.

3. Apparatus according to claim 2, in which said electrode system is the platen type.

4. Apparatus according to claim 2, in which said electrode system is the staggered type.

5. Apparatus according to claim 2, in which said electrode system is the stray field type.

6. A method for preparing pizza in commercial quantities, which comprises:

loading pizza dough shells onto a conveyor;

proofing the shells by means of radio frequency energy in a radio frequency chamber associated with the conveyor downstream from the loading station;

loading ingredients onto the proofed shells as the shells travel past the ingredient loading station;

baking the fully topped pizzas in an oven located downstream from the ingredient loading station; and unloading the fully baked pizzas at an unloading station located downstream from the oven.

7. A method according to claim 6, including the step of pre-proofing the pizza dough in its bulk form in a convection proofing prior to loading the dough in shell form on the conveyor.

8. A method according to claim 6, in which said radio frequency chamber has output power density in the range of about 7.5 to 13.0 KW per square meter and operates at a frequency of 27.12 MHz+/−0.06%.

9. A method according to claim 8, in which the temperature of said pizza dough shells at the time of entry into said radio frequency chamber is between about 20 to 23 degrees Celsius.

10. A method according to claim 9, in which said pizza dough shells are in the radio frequency chamber for a time period in a range of about 20 to 30 seconds.

11. A method according to claim 10, in which said pizza dough shells exit said radio frequency chamber at a temperature between about 32 and 40 degrees Celsius.

12. A method according to claim 6, in which said oven is of the air-impingement type and operates at a process temperature between about 230 and 290 degrees Celsius.

13. A method according to claim 12, in which said fully topped pizzas are in said impingement oven for a time period in a range of about 1 to 2 minutes.

14. A method according to claim 13, in which said impingement oven has slot heights ranging from 50 to 205 millimeters above the pizza shells and within 50 millimeters from the bottom of the conveyor belt, and directs hot air against the top and bottom sides of the topped pizzas at a velocity of about 4 to 7 meters per second.

* * * * *